July 10, 1928.
O. A. FREDERICKSON
1,676,486
CONDUIT FOR ELECTRIC CONDUCTORS
Filed May 4, 1923
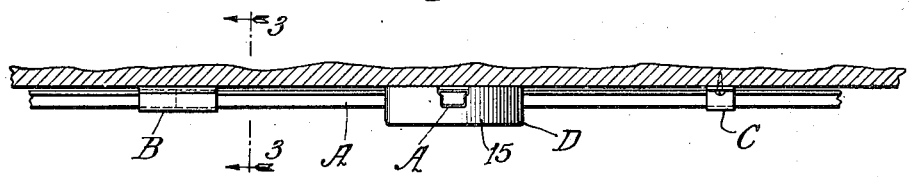
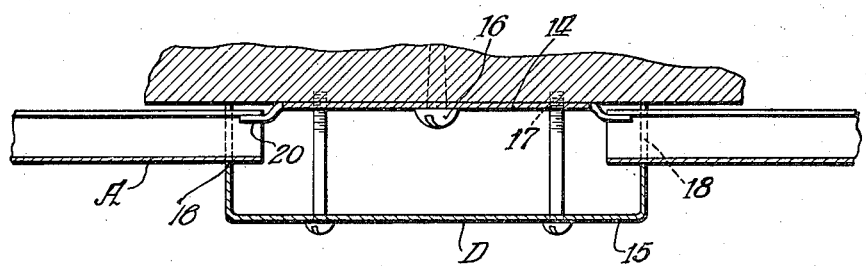
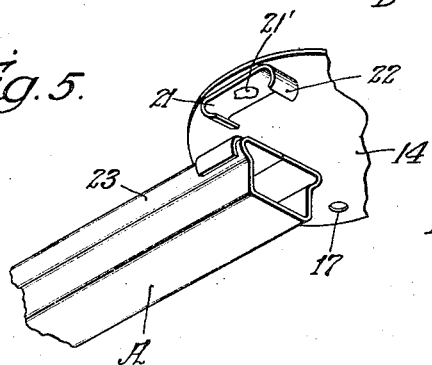
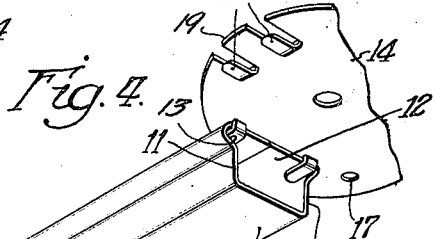
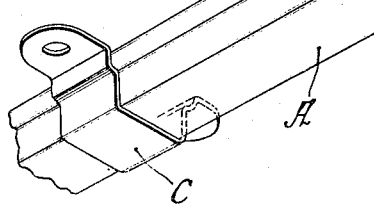
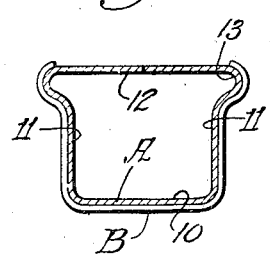
Inventor.
O. A. Frederickson Patented July 10, 1928.

1,676,486

UNITED STATES PATENT OFFICE.

OTTO A. FREDERICKSON, OF HARTFORD, CONNECTICUT, ASSIGNOR TO AMERICAN WIREMOLD COMPANY, OF HARTFORD, CONNECTICUT, A CORPORATION OF PENNSYLVANIA.

CONDUIT FOR ELECTRIC CONDUCTORS.

Application filed May 4, 1923. Serial No. 636,529.

My invention relates to an improved conduit for electric conductors, and is concerned with the provision of a conduit capable of application to a wall, ceiling, or other exposed supporting surface, or to be concealed in floors, walls and partitions; my improved conduit being particularly useful in installing electrical systems after the erection of a building, and extending existing systems, and for other like uses.

Generally speaking, it is the object of my invention to provide a conduit which is of simple and inexpensive construction; which has a neat and graceful appearance when applied to a wall or other supporting surface; which can be easily assembled; which can be fitted and applied to a supporting surface with no other trimming than merely cutting the pieces to proper length; which provides a smooth, uninterrupted and unblocked wire channel, and which also provides perfect electrical continuity of the conduit so that it may be grounded and, if desired, used as the return or ground conductor of an electrical system.

The conduit of my invention is particularly characterized by the fact that each of its tubular sections, while having the general appearance of a piece of molding when applied to a supporting surface, is formed of a single piece of metal, and is dust and moisture tight, this being a feature of construction which renders the conduit economical to manufacture, and most satisfactory in service.

My invention also contemplates and provides improved means for effecting mechanical and electrical connection between successive sections of conduit, and for attaching the conduit to fittings such as junction boxes, outlet boxes, etc., as well as to conduit elbows, T's and the like.

The foregoing and other features, objects and advantages of my improved conduit will more fully appear from the following detailed description, wherein reference is made to the accompanying drawings, in which;

Figure 1 is a side view partly in section, and partly in elevation, illustrating several lengths of my improved conduit applied to a ceiling and leading into a suitable fitting which, in the present case, happens to be a junction box;

Figure 2 is an enlarged view illustrating the outlet box in axial section, and illustrating two sections of the conduit in central longitudinal section;

Figure 3 is a transverse section taken on line 3—3 of Figure 1, and looking in the direction indicated by the arrows;

Figure 4 is a perspective illustrating how the base plate of a fitting, such as the junction box, may be made to co-operate with the internal grooves or channels of the conduit sections, and Figure 5 is a view similar to Figure 4 disclosing a modified means of holding an end of the conduit to the base plate of a fitting.

Similar characters of reference refer to similar parts throughout the several views.

Each of the conduit sections indicated at A consists of a single piece of stiff imperforate metal conformed to provide the forward wall 10, the side walls 11—11, and the flat base 12. Base 12 is formed by bringing the lateral edges of the metal together, and preferably butt-welding them, although the welding is not essential. Each of the side walls 11 is conformed to provide a substantially semi-cylindrical inwardly opening groove or channel 13, located immediately adjacent to the base 12, and co-extensive with the conduit section. It is to be understood, however, that while it is more practical to locate the seam on the base of the conduit, I contemplate that it may extend along any of the several walls.

The conduit constructed as hereinbefore described is preferably cut in standard lengths, convenient for handling and shipment in that condition to the place of use, the wires being "fished" through the conduit after erection, an operation which is by no means difficult because the conduit of my invention affords a passage free from obstructions which might catch or hold the wires when the latter are drawn therethrough.

For securing successive conduit sections to each other, I preferably employ a sleeve B, which is formed of spring metal, and is generally U-shaped in transverse cross-section. This sleeve overlaps the joint between the butted conduit sections, and is conformed tightly to embrace and snugly to fit the walls 10 and 11 of the sections. The metal of which the sleeve is formed is preferably comparatively thin, and is not objectionably conspicuous, particularly if it is given the same finish as is given to the conduit sections joined thereby. A sleeve of this type affords a very good mechanical and electrical connection between successive conduit sections.

Conduit of the type herein described may be secured to a ceiling or other supporting surface by any suitable fastening devices, for instances, by screws and suitable U-shaped straps of the type illustrated at C.

At D I have illustrated a junction box, which is representative of various kinds of similar fittings which may be used in connection with the conduit of my invention. The junction box as herein shown comprises a base 14 and a cover 15. Base 14 is provided with a central aperture for the reception of a supporting screw 16 and is conveniently tapped at 17—17 for the reception of screws whereby the cover 15 is held in position upon the base.

The cover 15 may be provided with a plurality of openings 18—18 for the reception of the ends of the conduit sections which lead into the junction box. The shape of these openings preferably corresponds to the transverse cross-section of the conduit, and the formation of such openings is conveniently facilitated by providing the box cover with a plurality of "twist-outs" in accordance with the usual practice.

Base 14 is provided with a plurality of sets of three tongues each. The middle tongue of each set, indicated at 19, lies in the plane of the base, while the other two tongues indicated at 20—20 are pressed away from the plane of the base. Each of these sets of tongues lies opposite one of the cover openings 18. In assembling the box with the conduit sections which lead therefrom, the bases of the conduit sections are forced between the tongues 19 and 20—20, that is, with the tongues 19 lying against the outer surface of the conduit bases 12 and with the tongues 20—20 lying against the inner surfaces of the conduit bases and within the lateral grooves or channels 13—13. This construction affords a sufficiently rigid, but readily detachable, connection between the conduit sections and the junction box, and so locates the tongues 20—20 within the conduit sections that they afford practically no obstruction to the wires which may be drawn through the conduit either from or into the junction box.

I have shown in Figure 5 an alternative means for holding the end of a conduit to the base fitting, replacing the spaced tongues 13, this securing means comprising a plurality of clips 21 secured, preferably by the spot-weld indicated at 21', to the base plate in positions similar to those occupied by the tongues in Figure 4. The lateral ends 22 of these clips are curled back to fit over the longitudinal beads 23 of the conduit side walls.

If desired, the clips 21 may be made of spring metal so that the conduit can be snapped into position rather than be pushed longitudinally into the clips. Obviously, the advantage of the construction of Fig. 5 over that of Fig. 4 is that a workman need not use such care in making sure the tongues entering the conduit do not obstruct the free passage of wires therethrough.

From the foregoing description, it will be understood that I have provided a conduit which is of pleasing appearance, economical to manufacture, easy to install and which in all other respects complies with the requirements of a high-grade metallic conduit.

Having thus described my invention, what I claim is new and desire to secure by Letters Patent of the United States is:

1. In a conduit for electrical conductors and the like, the combination of a one piece closed conduit of relatively stiff material, having a flat base and having substantially straight ends, with a supporting plate of relatively stiff material comprising a flat plate having a plurality of tongues struck from the same within the boundary of said plate, said tongues being bent to extend outward substantially parallel to said plate and spaced from said plate sufficient to receive the base of said conduit.

2. In a conduit for electrical conductors and the like, the combination of a closed conduit having a flat base, said conduit being formed of a substantially rectangular sheet of metal with its opposite edges abutting, with a supporting plate, comprising a flat metal plate having a plurality of tongues struck from the same within the boundary of said plate, said tongues being bent to extend outward substantially parallel to said plate and spaced from said plate sufficient to receive the base of said conduit.

3. In a conduit for electrical conductors and the like, the combination of a closed conduit having a flat base, said conduit being formed of a substantially rectangular sheet of metal with its opposite edges abutting and welded together, with a supporting plate, comprising a flat metal plate having a plurality of tongues struck from the same within the boundary of said plate, said tongues being bent to extend outward substantially parallel to said plate and spaced from said plate sufficient to receive the base of said conduit.

4. In a conduit for electrical conductors and the like, the combination of a one piece closed conduit of relatively stiff material, having a flat base, a laterally projecting bead in each side adjacent said base, and having substantially straight ends, with a supporting plate of relatively stiff material comprising a flat plate having a plurality of tongues struck from the same within the boundary of said plate, said tongues being bent to extend outward substantially parallel to said plate and spaced from said plate sufficient to receive the base of said conduit, said tongues being located to engage said base within said beads.

5. In a conduit for electrical conductors and the like, the combination of a one piece closed conduit of relatively stiff material, having a flat base, having a cross section of which said base is the widest portion, and having substantially straight ends, with a supporting plate of relatively stiff material comprising a flat plate having a plurality of tongues struck from the same within the boundary of said plate, said tongues being bent to extend outward substantially parallel to said plate and spaced from said plate sufficient to receive the bottom of said conduit and said tongues being located to engage the extreme edges of said base, a cover for said plate having a plurality of knockouts to form apertures to receive said conduit, and means to fasten said cover to said plate.

6. In a conduit for electrical conductors and the like, the combination of a one piece metal conduit, having a flat base and having substantially straight ends, with a supporting plate of sheet metal having an integral tongue struck from the same within the boundary of said plate, said tongue extending outward substantially parallel to said plate and spaced from said plate sufficient to receive the base of said conduit.

In witness whereof, I hereunto subscribe my name this 21st day of April, 1923.

OTTO A. FREDERICKSON.